(No Model.)
D. A. RICH.
SLEIGH BELL.
No. 300,896. Patented June 24, 1884.
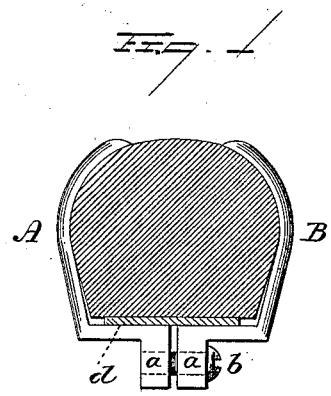
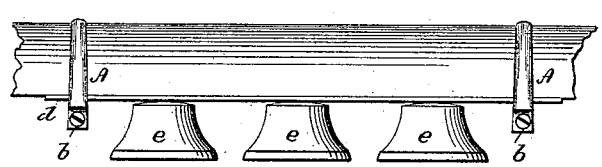

UNITED STATES PATENT OFFICE.

DENISON A. RICH, OF EAST HAMPTON, CONNECTICUT, ASSIGNOR TO THE STARR BROS. BELL COMPANY, OF SAME PLACE.

SLEIGH-BELL.

SPECIFICATION forming part of Letters Patent No. 300,896, dated June 24, 1884.

Application filed March 22, 1884. (No model.)

*To all whom it may concern:*

Be it known that I, DENISON A. RICH, of East Hampton, in the county of Middlesex and State of Connecticut, have invented a new Improvement in Sleigh-Bell Attachments; and I do hereby declare the following, when taken in connection with accompanying drawings and the letters of reference marked thereon, to be a full, clear, and exact description of the same, and which said drawings constitute part of this specification, and represent, in—

Figure 1, a transverse section of a shaft, showing the clamp applied; Fig. 2, a side view of the shaft, showing the two clamps.

This invention relates to a device for securing sleigh-bells to the shafts of sleighs.

Bells for attachment to the shafts are generally arranged upon straps of leather, metal, or other suitable material—several placed on a single strap—and this strap is made fast to the under side of the shaft, the more general method of securing being to insert nails or screws through the strap directly into the shaft. It frequently occurs, however, that it is desirable to detach the bells or to change or replace them.

Clamping devices have been made to extend over the top of the shaft and down underneath it, with a screw there introduced to bear directly on the strap.

The object of my invention is to construct a clamp which will grasp the shaft and strap, the screw applied to contract the circumference of the clamp, so as to make the bearing of the clamp directly upon the strap, like a hoop or band, and in such a clasp, as hereinafter described, my invention consists.

The clasp is made in two parts, A B, these parts constructed so as to extend one up one side and the other up the opposite side of a shaft, as seen in Fig. 1, and turned below the shaft, where they each terminate in a downwardly-projecting lug, *a*. One of these lugs is screw-threaded, and the other has a corresponding hole through it, and through the hole a screw, *b*, is introduced, running into the hole in the other lug, and so that by turning the screw inward the two parts are made to approach each other at that point. The clasps A B are curved corresponding to the shaft, and on their outer surface are rounded to give them a bead-like appearance, as seen in Fig. 2. *d* represents the strap, which is placed upon the under side of the shaft, and a pair of these clamps placed upon the shaft, as seen in Fig. 1. Near each end of the strap the two parts of the clasp upon the under side of the shaft come to a bearing directly upon the strap, and so that as the two parts are drawn together, as seen in Fig. 1, they firmly clamp the strap to the under side of the shaft. By this construction the head of the screw is not exposed, as in a clamp made of a single piece and where the screw is introduced from the under side to bear up against the strap. These clasps also make a long bearing on the strap, much greater than can be made by the point of a screw, and the clamping is therefore more firm.

I claim—

The combination of the strap *d*, carrying bells *c*, and fitted for attachment upon the under side of the sleigh-shaft, the two parts of the clasp A and B constructed to extend one up each side the shaft, each turned inward below the shaft, and so as to bear upon the strap, each part terminating in a downwardly-projecting lug, *a*, and a screw, *b*, passing freely through a hole in one lug and into a correspondingly screw-threaded hole in the other lug, and whereby the two parts are clamped upon the shaft and upon the bell-strap, substantially as described.

DENISON A. RICH.

Witnesses:
HERMAN E. RICH,
CHAS. S. GOFF.